Patented Mar. 3, 1953

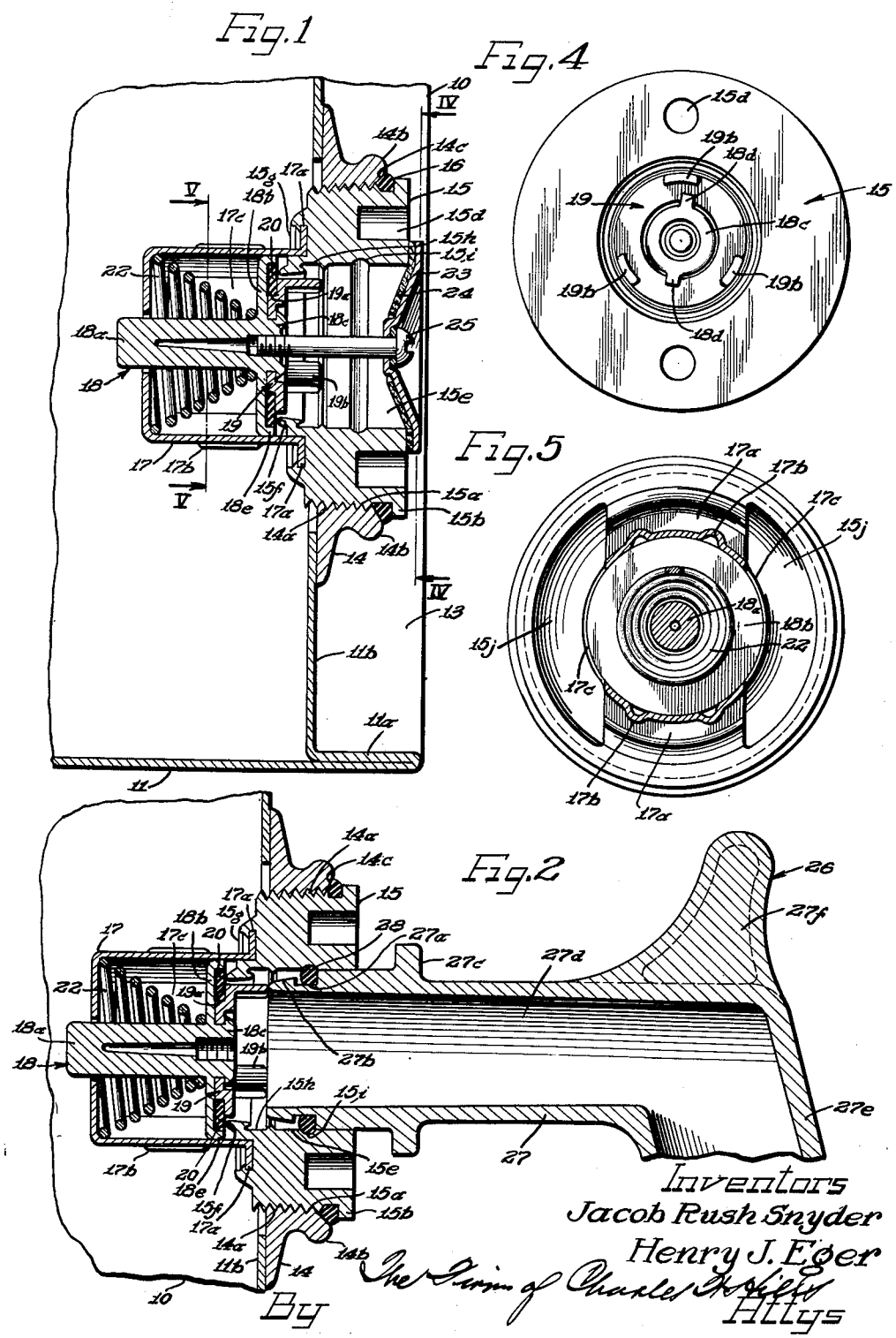

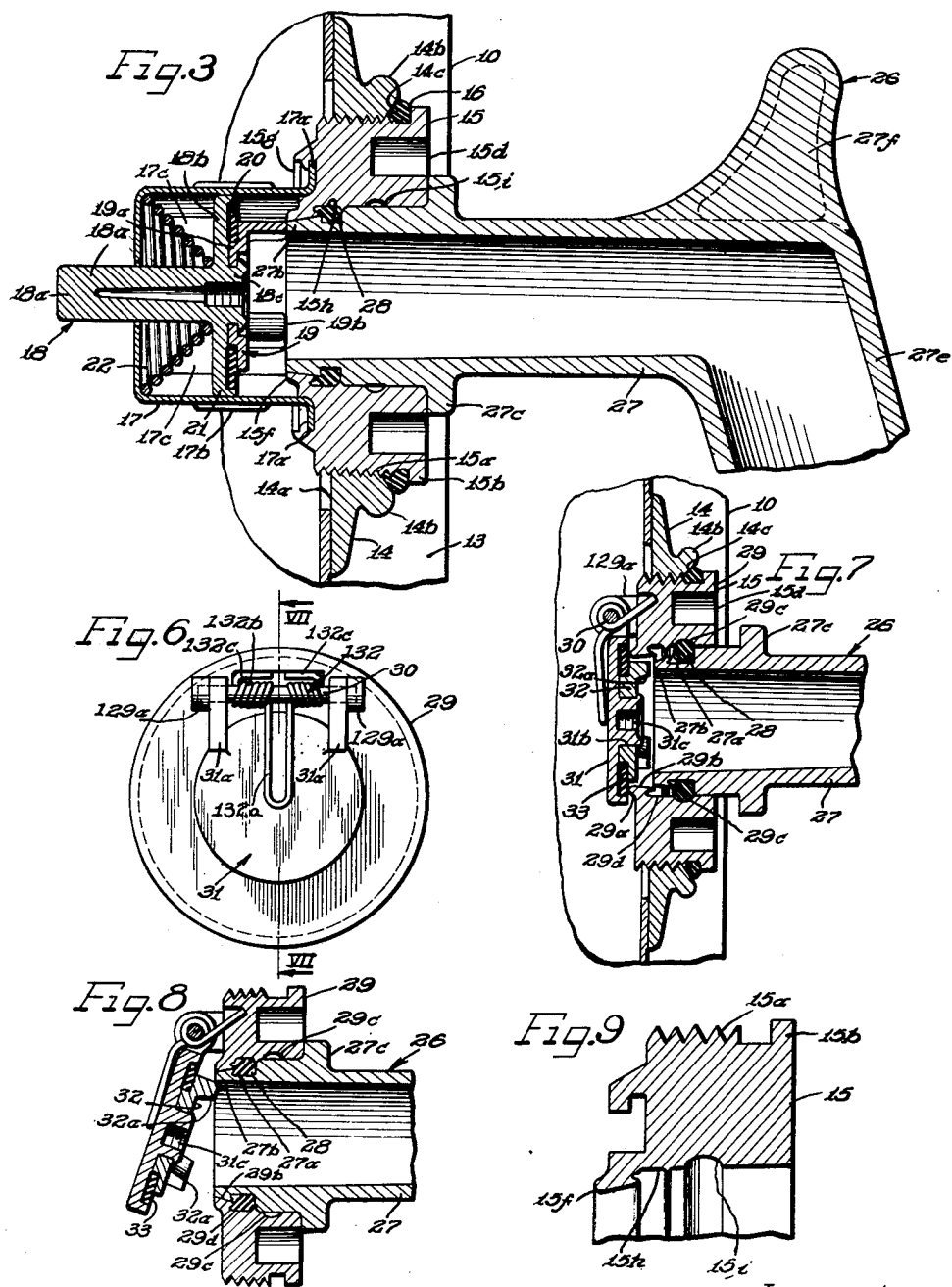

2,630,337

UNITED STATES PATENT OFFICE 2,630,337

VALVED RING AND SPIGOT ASSEMBLY

Jacob Rush Snyder, Cleveland, and Henry J. Eger, Lyndhurst, Ohio, assignors to Thompson Products, Inc., Cleveland, Ohio, a corporation of Ohio Application August 28, 1948, Serial No. 46,662

4 Claims. (Cl. 284—14)

1

In particular, this invention relates to a valve-equipped bung bushing assembly for receiving a seal ring carrying valve actuating detachable spigot which selectively positions the seal ring in recesses of the assembly to releasably retain the spigot for holding the valve in open position or out of valve actuating position.

According to this invention a ring adapted to fit a bung bushing is equipped with a spring-loaded valve to control drainage from a barrel or drum. This bushing ring has a passageway therethrough adapted to slidably receive a demountable spigot. The end of the spigot actuates the valve to open position. In order to prevent leakage between the passageway and spigot and to retain the spigot in axially adjusted position in the bushing ring, the spigot carries a resilient seal ring around the end thereof received by the bushing ring. The bushing ring has a plurality of axially spaced annular grooves arranged to sealingly retain the spigot seal ring and thereby hold the spigot in adjusted positions in the bushing ring. At least one of the grooves is positioned to retain the spigot so that it will hold the valve in an open condition, while one of the grooves is positioned to prevent too rapid withdrawal of the spigot from the bushing ring after the valve is closed, thereby eliminating the splashing of fluid through the bushing ring.

It is an object of the invention to provide a cap and spigot assembly for containers such as drums, barrels and the like which permits rapid insertion and withdrawal of a disconnected drain spigot without destroying the hermetic sealing capacity of the cap.

It is a further object of the present invention to provide a spigot and seal assembly for releasable insertion into a valved bung bushing in selected positions to hold the valve in open condition and to eliminate splashing of the liquid from the bushing as the spigot is withdrawn.

Another object of the present invention is to provide a spigot and ring assembly for selective insertion into containers for gasoline and other volatile fluids to permit withdrawal of liquid without excessive volatilization loss of the liquid during the drainage operation.

A still further object of the invention is to utilize a single seal on a drum spigot for holding the spigot in adjusted positions in a bung bushing while preventing leakage between the spigot and bushing.

Other and further objects of the invention will be apparent from the following description of the annexed sheets of drawings, which illustrate several preferred embodiments of the invention.

In the drawings:

Figure 1 is a fragmentary cross-sectional view of the end head of a metal drum equipped with a cap assembly according to the present invention and illustrating the assembly in hermetically sealed and locked condition as in transit or storage;

Figure 2 is a view similar to Figure 1 but showing a drain spigot inserted in the bushing;

Figure 3 is a view similar to Figure 2, but illustrating the drain spigot in position for withdrawal of fluid;

Figure 4 is a front end view taken along the line IV—IV of Figure 1 but with the lock cap removed;

Figure 5 is a transverse cross-sectional view taken substantially along the line V—V of Figure 1 but with parts removed;

Figure 6 is an end elevated view of the inner end of an assembly representing another embodiment of the invention;

Figure 7 is a fragmentary cross-sectional view of the end head of a metal drum equipped with the assembly shown in Figure 6 and taken along the line VII—VII of Figure 6;

Figure 8 is a view similar to Figure 7 but illustrating the drain spigot in valve opening position for the withdrawal of fluid; and Figure 9 is an enlarged fragmentary cross-sectional view of the bung bushing.

As shown on the drawings:

In Figures 1 to 3, inclusive, the reference numeral 10 designates generally a metal drum including a cylindrical side wall or shell 11 formed with a peripheral flange or skirt 11a and an end head portion 11b, providing a recess 13 on the end of the drum.

The drum head portion 11b has a bung bushing 14 attached thereto. The bung bushing 14 has internal threads 14a and a cylindrical neck terminating in bead 14b. The mouth of the bushing is beveled at 14c so that the threads 14a do not extend to the end of the bushing.

The bushing ring 15 of this invention has external threads 15a in threaded engagement with the threads 14a of the bushing 14. An out-turned flange 15b on the ring 15 overlies the mouth 14c and acts against a sealing gasket 16 to compress the gasket between the bushing and the ring. The ring 15 has a pair of recesses 15d therein adapted to receive a spanner wrench to tighten the ring in the bushing 14.

A central passage 15e extends through the ring 15 and has a valve seating face 15f which surrounds the inner edge of this passage. Annular recessed portions 15h and 15i are axially spaced in passage 15e for receiving a sealing ring on the drain spigot, as will be hereinafter described. This construction is best illustrated in Figure 9.

A cylindrical cup-like stamped metal housing 17 is mounted on the inner face of the ring 15 to slidably support a stemmed valve 18 which coacts with the seat 15f. The housing 17 has a pair of out-turned flanges 17a seated within a pair of recesses in the inner face of the ring and locked therein by spun-over lips 15g. The cylindrical side wall of the housing 17 has vertical ribs 17b stamped therein to rigidify the housing. Opposed ports 17c are also provided in the side wall of the housing to give free access to the interior of the housing.

As shown on Figure 5, ring 15 has a pair of recesses 15j adjacent the ports 17c to increase the drainage flow capacity into the housing 17.

A stemmed valve 18 is slidably mounted within housing 17. The stemmed valve 18 includes a stem 18a fitting freely through a hole in the closed end of the housing 17 and a disc-like head 18b slidably engaging the side wall of the housing. The head 18b has an annular recess in its end face providing a central internally upstanding lug portion 18c receiving a metal washer member 19 therearound. A resilient washer or gasket 20 is positioned in the annular recess and surrounds a boss portion 19a of the washer 19. The lug projects through the washer 19, and ears 18d are pinched therefrom over the washer 19 to clamp the gasket 20 against the valve head 18b. The gasket 20 is surrounded by a rim 18e of the head 18b and is partially covered by the washer 19 to leave an exposed face portion for coacting with the seat 15f. This gasket 20 is constructed of resilient material such as chloroprene rubber which can withstand attack by the fluids contained in the drum.

The washer member 19 has a plurality of upstanding peripheral fingers 19b at spaced intervals therearound and adapted to fit through the seat 15f.

A coil spring 22 surrounds the stem 18a and is compressed between the closed end of the housing 17 and the valve head 18b to urge the gasket 20 toward the seat 15f to normally maintain the valve in closed position.

Figure 1 shows the assembly locked in sealed position for transit or storage purpose. Thus a stamped metal lock cap 23 fitted with a resilient gasket 24 is disposed over central passage 15e of ring 15. The cap 23 is apertured for the reception of screw 25 which is threaded into the boss or lug 18c to lock the valve member against valve seat 15f.

Figure 2 shows the assembly with the lock cap gasket and screw removed and with a drain spigot 26 inserted partially into the passage 15e. The spigot assembly includes a die-cast body 27 and a rubber-like O ring seal 28 closely fitted into a wider groove 27a of the spigot body. The spigot has a converging, tapered end portion 27b snugly fitting the tapered inner end of the passage 15e and adapted to act on the fingers 19b for opening the valve 18. The passage 15e tapers or converges inwardly to the valve seat 15f to receive the tapered end 27b so that the discharge passage through the spigot can have a diameter almost as large as the seat 15f, thereby accommodating full discharge capacity flow from the valve.

A shoulder 27c or flange is provided on the spigot to be bottomed on ring 15 for limiting the travel of the spigot into passage 15e.

The body 27 of spigot assembly 26 has an angled passage 27d extending outwardly from the end face 27b through a downwardly extending discharge spout portion 27e. A convenient operating handle 27f is provided above spout 27e.

In Figure 2 the spigot assembly is shown partially inserted into passage 15e so that O ring 28 is held by recess 15i of ring 15. In the position shown, the valve is still closed and the container sealed by virtue of the contact between gasket 21 and valve seat 15f.

Figure 3 shows the condition when the spigot 26 is completely inserted into passage 15e and the valve assembly is open to permit drainage. In this position O ring 28 is seated in recess 15h of ring 15, and the tapered end portion 27b is fitted into the valve seat portion 15f. The valve stem 18a is extended through the apertured valve housing 17, and coil spring 22 is collapsed so that gasket 21 is unseated from valve seat 15f. Liquid may then flow from the interior of the drum through the housing ports 17c into the drain spigot.

When sufficient drainage has been effected, the spigot 26 may be removed from the assembly. An initial outward thrust will cause the sealing O ring 28 to disengage from recessed portion 15h and engage in recessed portion 15i. At this point the valve is closed and no more liquid will leave the container. This condition is shown by Figure 2. A second outward thrust will then disengage O ring 28 from recess portion 15i and permit complete withdrawal of spigot 26 from the assembly. This dual action, in slowing down the withdrawal of the spigot, permits drainage of the contents in the angled passage 27d and prevents leakage between the spigot and lug 15, thereby protecting the operator against splashing such as would occur if the spigot 26 were removed from the sealed chamber in one quick outward thrust.

Figures 6, 7 and 8 show another embodiment of the present invention, utilizing a different type of valve construction.

Figure 6 shows a rear view of the bushing ring and valve construction, with a ring 29 equipped with a pair of lugs 129a projecting from the inner face thereof in spaced opposed relation and receiving the ends of a pin 30.

A closure valve 31, in the form of a disk, coacts with seat 29a of ring 29 to close drain passage 29b. Valve 31 has a pair of ears or lugs 31a receiving pin 30 therethrough to swingably mount the valve on the ring. The outer face of the valve has shoulder portion 31b around a central internally threaded lug or boss 31c for the insertion of a locking screw as previously described. A metal washer 32 containing a plurality of outwardly extending finger members 32a is disposed around the shoulder 31b and anchored thereon by peening the shoulder thereover.

The inner face of valve 31 is engaged by a bifurcated spring finger 132a of a torsion spring 132 having coils 132b disposed around the pin 30 and free ends 132c bottomed on the inner face of ring 29. The torsion spring 132 urges the valve 31 into the closed position as shown in Figure 7. A washer or gasket 33, made of a resilient material such as chloroprene rubber, is disposed between the washer 32 and valve 31 to present a face for engaging the valve seat 29a to seal passageway 29b when valve 31 is closed.

Figure 7 shows the condition wherein spigot 26, containing a recessed portion 27a and carrying resilient O ring 28, is inserted into the ring assembly so that seal ring 28 is engaged in recess portion 29c of ring 29. In this position, the valve 31 is still closed due to the sealing engagement of sealing ring 33 with valve seat 29a. When the spigot is completely thrust into ring assembly 29, as shown in Figure 8, the shoulder 27c is bottomed on ring 29, and inner face 27b of spigot 26 engages outwardly extending finger members 32a to unseat the valve 31 from the seat 29a. In the completely open position, as shown in Figure 8, the uppermost finger member 32a is held below the face 27b of Figure 26 in a "self-locking" position. The force exerted by spring 32 upon valve 31 then acts to urge spigot 26 upwardly against ring 29 rather than urging it outwardly from the ring 29. The ring 28 is seated in the recess 29d and retains the spigot in valve open position.

When sufficient drainage has occurred, spigot 26 is pulled out of the assembly in two stages. In the first, represented by Figure 7, the valve 31 is closed as the seal ring 28 carried on recess 27a of spigot 26 is engaged in recess 29c of ring 29 having been removed from recess 29d. A second outward pull on spigot 26 will free the sealing ring 28 from engagement and permit complete withdrawal of the spigot from the ring assembly without splashing the contents of the spigot drain portion.

From the above description it will be understood that this invention provides a self-closing cap assembly for drums, barrels, and other containers that is adapted to be readily mounted in the bung bushing of a drum or barrel and can be locked in position for storage and shipping, or can receive a demountable drain spigot carrying a single seal ring for selective positioning of the spigot.

It will, of course, be understood that various details of construction may be varied through a wide range without departing from the principles of this invention, and it is, therefore, not the purpose to limit the patent granted hereon otherwise than necessitated by the scope of the appended claims.

We claim as our invention:

1. In a cap and spigot assembly for a bung bushing equipped container comprising a ring adapted to be secured in a bung bushing, said ring having a flow passage therethrough, a valve seat at the inner end of said ring, a spring-urged valve member mounted on said ring and engageable with said valve seat to control the flow of fluid through said flow passage, a spigot slidably mounted in said flow passage and carrying means engageable with said valve member for controlling opening and closing thereof, said ring having a pair of axially separated annular grooves formed in said flow passage, and an annular seal ring member carried on said spigot and received in one of said grooves to seal and retain said spigot in selected position in said flow passage.

2. In a cap and spigot assembly for a bung bushing equipped container comprising a ring adapted to be secured in a bung bushing, said ring having a flow passage therethrough, a valve seat at the inner end of said ring, a spring-urged valve member mounted on said ring and engageable with said valve seat to control the flow of fluid through said flow passage, a spigot slidably mounted in said flow passage, said ring having a pair of axially separated annular grooves formed in said flow passage, and an annular seal ring member carried on said spigot and received in one of said grooves to seal and retain said spigot in selected position in said flow passage, said spring-urged valve member more particularly comprising a disk-shaped valve member hinged to said ring and having a torsion spring between said valve member and said ring to bias same closed, said valve member having finger members arranged to project into said passage when said valve is closed to engage said spigot member.

3. In a cap and spigot assembly for a bung bushing equipped container comprising a ring adapted to be secured in a bung bushing, said ring having a flow passage therethrough, a valve seat at the inner end of said ring, a spring-urged valve member mounted on said ring and engageable with said valve seat to control the flow of fluid through said flow passage, a spigot slidably mounted in said flow passage and carrying means engageable with said valve member for controlling opening and closing thereof, said ring having a pair of axially separated annular grooves formed in said flow passage, and an annular seal ring member carried on said spigot and received in one of said grooves to seal and retain said spigot in selected position in said flow passage, said spring-urged valve member more particularly comprising a reciprocating poppet-valve carried in a cup-shaped housing mounted on said ring and having a coil spring bottomed against said housing and against said poppet-valve.

4. In a cap and spigot assembly for a bung bushing equipped container comprising, a bushing ring having a central passage therethrough, a valve-seating face on said ring surrounding the inner edge of said central passage, an annular tapered neck in said passage adjacent said valve-seating face, axially spaced annular recess portions in said passage, spring-biased valve means mounted on said ring and engageable with said seating face to control the flow of fluid through said passage, a spigot member slidably mounted in said passage and having a tapered end portion snugly fitted in said tapered neck, said end portion engaging said valve means to unseat same, said spigot having an annular groove in the surface thereof, and an O ring seal member in said groove and projecting radially outwardly of said groove, said seal member received in one of said spaced annular recess portions to seal and retain said spigot member in selected axially spaced positions in said passage.

JACOB RUSH SNYDER.
HENRY J. EGER.

REFERENCES CITED

The following references are of record in the file of this patent:

UNITED STATES PATENTS

| Number | Name | Date |
|---|---|---|
| Re. 1,573 | Sellers | Nov. 24, 1863 |
| 209,244 | Gaffron | Oct. 22, 1878 |
| 485,847 | Murray | Nov. 8, 1892 |
| 562,414 | O'Leary | June 23, 1896 |
| 695,767 | Steitz | Mar. 18, 1902 |
| 756,582 | Chaplin | Apr. 5, 1904 |
| 889,952 | McGinley et al. | June 9, 1908 |
| 1,502,673 | Hole | July 29, 1924 |
| 2,094,629 | Whittam | Oct. 5, 1937 |
| 2,283,970 | Buttner | May 26, 1942 |
| 2,358,666 | Spayd | Sept. 19, 1944 |
| 2,486,270 | Fawick | Oct. 25, 1949 |

FOREIGN PATENTS

| Number | Country | Date |
|---|---|---|
| 12,164 | Great Britain | May 16, 1914 |
| 13,630 | Great Britain | July 16, 1895 |
| 152,231 | Austria | Sept. 15, 1937 |
| 218,619 | France | Apr. 1, 1942 |
| 543,733 | Great Britain | Mar. 10, 1942 |